US009736105B2

(12) United States Patent
Sorg

(10) Patent No.: US 9,736,105 B2
(45) Date of Patent: Aug. 15, 2017

(54) DISPLAYING A FEED OF CONTENT IN A SOCIAL NETWORKING SYSTEM

(71) Applicant: Facebook, Inc., Menlo Park, CA (US)

(72) Inventor: Jonathan Daniel Sorg, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 238 days.

(21) Appl. No.: 14/741,568

(22) Filed: Jun. 17, 2015

(65) Prior Publication Data

US 2016/0373396 A1    Dec. 22, 2016

(51) Int. Cl.
*G06F 15/16* (2006.01)
*H04L 12/58* (2006.01)
*G06Q 50/00* (2012.01)
*G06F 17/30* (2006.01)

(52) U.S. Cl.
CPC .............. *H04L 51/32* (2013.01); *G06Q 50/01* (2013.01); *G06F 17/30905* (2013.01)

(58) Field of Classification Search
USPC ....... 709/203, 204, 206, 217, 219, 223, 224, 709/226, 228, 231, 232, 238; 713/193; 715/769; 1/1
See application file for complete search history.

(56) References Cited

U.S. PATENT DOCUMENTS

| | | | |
|---|---|---|---|
| 8,850,006 B2 * | 9/2014 | Ashear ............... | G06F 13/00 709/224 |
| 9,223,475 B1 * | 12/2015 | Kim .................. | G06F 3/0483 |
| 9,300,617 B2 * | 3/2016 | Hallerstrom Sjostedt ............. | H04L 51/22 |
| 9,367,227 B1 * | 6/2016 | Kim .................. | G06F 3/04883 |
| 2006/0069925 A1 * | 3/2006 | Nakai ................ | G06F 21/10 713/193 |
| 2016/0018965 A1 * | 1/2016 | Park ................. | G06F 3/0486 715/769 |

\* cited by examiner

*Primary Examiner* — Quang N Nguyen
(74) *Attorney, Agent, or Firm* — Fenwick & West LLP

(57) ABSTRACT

A social networking system provides a content feed to a client device associated with the user of a social networking system, the content feed including a plurality of content items. The social networking system identifies a read section and an unread section of the content feed. The social networking system receives a request for a subsequent content feed from a client device associated with the user. The social networking system identifies new content items that are associated with users of the social networking system. The social networking system generates a current content segment that includes the new content items and the unread section of the content feed, and generates the subsequent content feed by inserting the current content segment before or after the read section of the content feed. The social networking system provides a portion of the subsequent content feed to the client device.

20 Claims, 3 Drawing Sheets

DISPLAYING A FEED OF CONTENT IN A SOCIAL NETWORKING SYSTEM

BACKGROUND

This disclosure relates generally to social networking systems, and in particular to ways of incorporating content items into new content feeds.

Social networking systems allow users to connect to and communicate with other users of the social networking systems. Users create profiles on a social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system allows users to easily communicate information about themselves to other users. For example, the social networking system generates stories describing actions performed by social networking system users and presents the stories to other social networking system users. However, not all stories delivered to a device associated with a user are actually presented to the user. Additionally, this missed content may have more value to the user than other more current stories in subsequent content feeds. Moreover, current systems generally add new stories at the top of a feed and a user may not read all the newly added stores. In subsequent feeds, this can result in a "striped" feed where new stories, read stories, and unread stories are interlaced throughout the subsequent feed.

SUMMARY

A social networking system generates content feeds including content items that are provided to a client device associated with a user for presentation to that user. However, in some embodiments, not all of the content items in the content feed are actually presented to the user. For example, a user may navigate away from the content feed after only viewing the first couple content items. The social networking system interfaces with the client device to determine what content items were previously provided to the client device in a content feed, but not actually viewed by the user. For example, the social networking system identifies a read section and an unread section of the content feed. The read section of the content feed includes one or more read content items. The unread section including one or more missed content items in the previous content feed. A read content item is a content item that was presented by a client device and a missed content item is a content item, of the plurality of content items, that was part of the content feed for the first client device, but was not presented by the first client device.

At some later time, a client device associated with the user may request a new or subsequent content feed, and the client device may be any client device associated with the user. The social networking system identifies one or more new content items that are associated with users of the social networking system. A new content item is a content item that has not been previously provided as part of a content feed to any user device associated with the viewing user. A current content segment is generated that includes the identified new content items and the unread section of the content feed (e.g., the missed content items). Additionally, in some embodiments, the current content segment may include one or more popular content items. A popular content item is a content item that was previously presented by the client device to the user and has an engagement score that has since increased above a threshold value (e.g., has received some number of likes, comments, etc.). The new or subsequent content feed is generated by inserting the current content segment (e.g., new content items) after the read section (e.g., read content items) of the previous content feed. At least a portion of the subsequent content feed is provided to the client device.

Using this arrangement, the new or subsequent content feed can be a continuous content feed of items the user would like to read (new plus missed content and/or popular content) following the last content item read by the user. In other words, it is not a striped content feed with, for example, a layer of new unread content followed by a layer of previously read content followed by a layer of previously missed unread content. Such a striped content feed can result in the user starting at the top and reading all the way through the layer of new content items, and then hitting a section of content the user has already read such that the user believes he has finished all of the unread content. This read content stripe in the feed thus creates a barrier to the next stripe of content that the user missed during the last content feed received, which may be content the user would like to see. Thus, instead of simply providing new content items on top of the prior feed, the feed is organized as described in more detail below such that the new and missed content section is presented immediately after the last read content to provide a continuous feed to the user, removing the need to scroll to the top of the feed and avoiding hitting the read content barrier.

In some embodiments, the social networking system may invert the content feed before providing it to the client device. An inverted content feed is one where the current content segment is positioned above the read content segment of the previous content feed.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
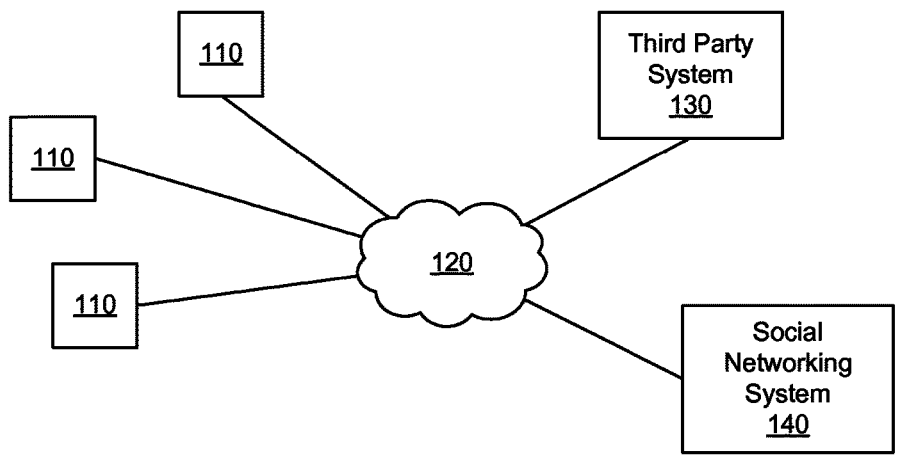
FIG. 1 is a block diagram of a system environment in which a social networking system operates, in accordance with an embodiment.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In some embodiments, a client device 110 includes instructions, such as program code, that when executed by the client device 110 communicates information describing what content items of a content feed were displayed and/or not displayed to a user via the client device 110. For example, the program code is included in an application associated with the social networking system 140 executing on the client device 110 and communicates information describing whether stories in a content feed were presented to a user of the social networking system 110 via the client device 110. As described in detail below with respect to FIG. 2, a content item may be a story or an advertisement. Content items that were part of the content feed, but not viewed by the user are referred to as missed content items (e.g., an unread story).

A user is considered to have viewed a content item when the content item is presented by a client device 110. The instructions executed by the client device 110 determine if a content item was presented to a user based on interactions with the client device 110. For example, a determination that the user viewed the content item may be based on a percentage of the content item presented by the client device 110, a time duration that some threshold amount of the content item is presented by the client device 110, or any other suitable information.

A status of a content item may be new, read, popular, or missed. A new content item is a content item that has not been previously presented by the client device 110, where it is the first time the content item has been provided in a content feed for the user. A read content item is a content item that has been presented by the client device 110. A popular content item is a content item that was previously presented by the client device 110 and has an engagement score that has since increased above a threshold value. And a missed content item is a content item that was part of a previous content feed, but was not viewed by the user (i.e., deemed to have not been presented by the client device 110). In some instances a content item may be referred to as being unread, an unread content item is a content item that has a status of new, popular, or missed.

In some embodiments, the client device 110 tracks statuses associated with content items in received content feeds via, e.g., an application associated with the social networking system 140. The client device 110 may store the tracked statuses in, for example, a status log. The status log is a database that tracks the most recent status of the content item in a content feed received from the social networking system 140. In embodiments, where a status associated with a content item is already in the status log, the client device 110 may remove or reposition a content item in a content feed if the status of the content item does not match the status of the content item in the status log. Additionally, in some embodiments, the content feed may include a time stamp associated with a status of a content item. The client device 110 may then compare the time stamp associated with the status of the received content item to the time stamp associated with the status of the content item in status log, and may adjust the status of the content item to be the status associated with the most recent time stamp. Thus, the client device 110 is able to ensure that the content items are presented to the user in the appropriate manner (e.g., a read content item is not presented as a new content item). In other embodiments, the client device 110 simply collects information and sends it to the social networking system 140 for tracking of status of content items (e.g., with status tracker 230 of FIG. 2).

In some embodiments, the client device 110 may receive instructions from the social networking system 140 that cause the client device 110 to emphasize content items that have not been presented by the client device 110. The client device 110 may emphasize a content item by, e.g., adding a vertical bar to one side of the content item being displayed, highlighting a boarder of the content item, oversizing the content item, some other indicator that differentiates the content item from other content items that have previously been presented by the client device 110, or some combination thereof. Once the content items have been presented, the client device 110 stops emphasizing the content item. For example, the client device 110 may emphasize a new content item in a content feed (e.g., by including a vertical bar to the left of the new content item). Once the client device 110 determines that the new content item has been presented (e.g., content item was presented for a time period exceeding a threshold value) the client device 110 removes the emphasis of the new content item (e.g., vertical bar fades away) and the status associated with the new content item changes from new to read.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
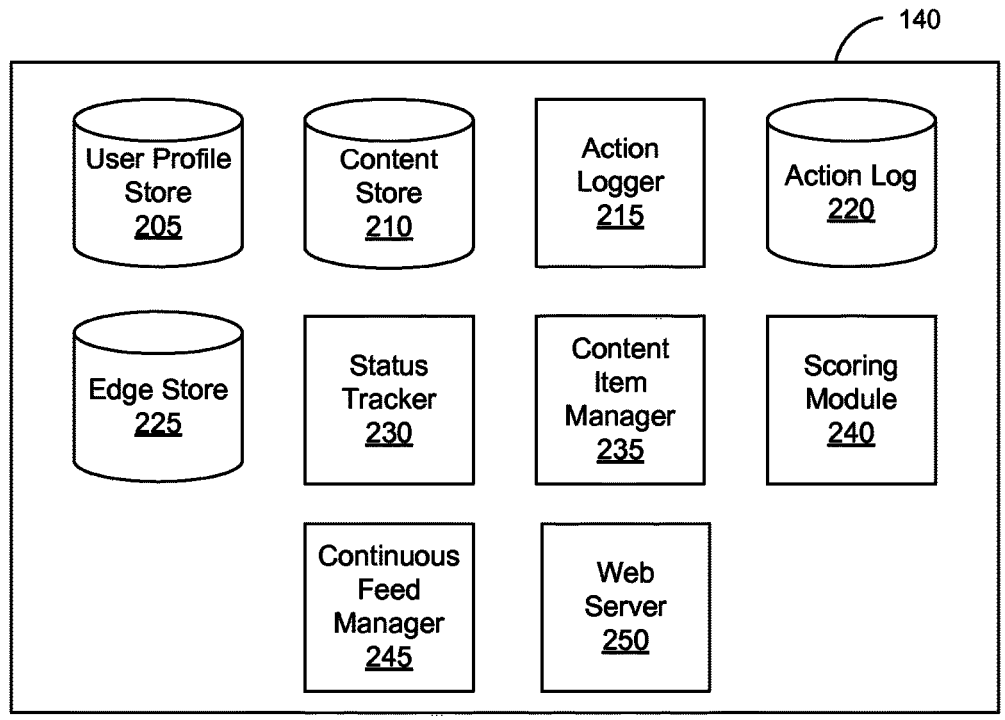
FIG. 2 is a block diagram of a social networking system, in accordance with an embodiment.

FIG. 2 is an example block diagram of an architecture of the social networking system 140. The social networking system 140 shown in FIG. 2 includes a user profile store 205, a content store 210, an action logger 215, an action log 220, an edge store 225, a status tracker 230, a content item manager 235, a scoring module 240, a continuous feed manager 245, and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140. Additionally, the content store 210 may store missed content items.

One or more advertisement requests ("ad requests") are included in the content store 210. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile, edges, and/or actions associated with a user to identify users having user profile information, edges or actions satisfying at least one of the targeting criteria. Hence, the targeting criteria allow an advertiser to identify groups of users matching specific targeting criteria, simplifying subsequent distribution of content to groups of users.

In one embodiment, the targeting criteria may specify actions or types of connections between a user and another user or object of the social networking system 140. The targeting criteria may also specify interactions between a user and objects performed external to the social networking system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object.

The content store 210 maintains a record of previous content feeds selected for and/or presented to users of the social networking system 140. A content feed is a feed including one or more content items. A content feed may be, e.g., a news feed. The record identifies what portions of a previously presented feed were read, i.e., part of a read section, and also identifies what portions of the previously presented content feed were unread, i.e., part of an unread section. In other embodiments, one or more other modules maintain a record of the previous content feeds presented the users of the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system 140, and commenting on posts made by other users of the social networking system 140.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The status tracker 230 tracks statuses associated with content items. As discussed above, a status of a content item may be new, read, popular, or missed. The status tracker 230 associates statuses with content items, and updates the statuses based on information received from the client device 110. The status tracker 230 tracks the statuses of content items that are associated with content feeds that have been, will be, are being, or some combination thereof, presented to users of the social networking system 140. In some embodiments, the status tracker 230 uses information received from the client devices 110 describing what content items of a content feed were presented and/or not presented via the client devices 110 to identify statuses of content items. The status tracker 230 updates the status associated with the content items using this information. For example, the information may indicate that a new content item was presented to the user, the status tracker 230 then updates the status of the new content item from new to read. Additionally, in some embodiments, the status tracker 230 includes a time stamp associated with the status of content items in the content feed.

For a content feed selected for and/or presented to a user, the status tracker 230 identifies a read section and an unread section of the content feed. The read section is a portion of the content feed that has been presented by the client device 110 to the user. The read section includes one or more read content items that are in a particular order (e.g., ordered by time read using time stamps associated with each read content item). The unread section is the remaining portion of the content feed. The unread section includes one or more missed content items. In some embodiments, the unread section may also include one or more popular content items. Note, in a feed actively being presented by the client device 110, the unread section corresponds to a current content segment (discussed below). If a content item in the unread section is presented to the user, the status tracker 230 removes the content item from the unread section and places it in the read section, or the status tracker 230 otherwise marks the content item or changes the marking/status from unread (i.e., a status of new, missed, or popular) to read.

The content item manager 235 receives requests for content feeds from client devices 110. A request may be received from any client device 110 that is associated with a user of the social networking system 140. Additionally, after providing a content feed to a requesting client device 110, the client device 110 (or some other client device 110 associated with the user) may request another content feed (a subsequent content feed) from the social networking system 140. For example, the user may log off of the social networking system 140 and log back on at a later time, or the user might simply navigate away a web page displaying the feed or move to another application from the social networking application displaying the feed. As another example, the user may refresh the page or select a link to update the feed or to get new stories.

The content item manager 235 identifies new content items likely to be of interest to users of a social networking system that have requested content feeds. A content item may be a story or an advertisement. A story describes an action taken by an additional user connected to the user and identifies the additional user. In some embodiments, a story describing an action performed by a user may be accessible to users not connected to the user that performed the action. The content item manager 235 may generate new stories for presentation to a user based on information in the action log 220 and in edge store 225 or may select candidate stories included in content store 210. For example, the content item manager 235 receives a request to present one or more content items to a social networking system user. The content item manager 235 accesses one or more of the user profile store 105, the content store 110, the action log 120, and the edge store 130 to retrieve information about the identified user. For example, new and/or unread stories or other new and/or unread data associated with users connected to the identified user are retrieved. The retrieved stories, advertisements, other data, or some combination thereof is analyzed by the content item manager 235 to identify content likely to be relevant to the identified user. For example, stories associated with users not connected to the identified user or stories associated with users for which the identified user has less than a threshold affinity are discarded as candidate content items. Based on various criteria, the content item manager 235 selects one or more of the candidate content items for presentation to the identified user in a content feed as new content items. Selection of content items for a content feed is further discussed in U.S. Pat. No. 7,827,208, filed on Aug. 11, 2006, U.S. Pat. No. 8,402,094, filed on Aug. 11, 2006, U.S. Pat. No. 8,171,128, filed on Aug. 11, 2006, U.S. Pat. No. 7,669,123, filed on Aug. 11, 2006, U.S. Pat. No. 8,700,636, filed on Sep. 16, 2010, U.S. Pat. No. 8,521,787, filed on Oct. 11, 2010, and U.S. application Ser. No. 13/194,773, filed on Jul. 29, 2011, each of which is hereby incorporated by reference in its entirety.

The content item manager 235 may also account for actions by a user indicating a preference for types of stories and selects stories having the same, or similar, types for inclusion in the content feed. Additionally, content item manager 235 may analyze stories received by social networking system 120 from various users and obtains information about user preferences or actions from the analyzed stories. This information may be used to refine subsequent selection of stories for content feeds presented to various users.

The content feed may include a limited number of content items or may include a complete set of candidate content items. The number of content items for inclusion in a content feed may be determined in part by a user preference included in user profile store 205. The content item manager 235 provides the selected content items to the scoring module 240.

The scoring module 240 generates engagement scores for each of the selected new content items and for the content items in the unread section of the previous content feed. Additionally, in some embodiments, the scoring module 240 generates engagement scores for one or more read content items in the read section of the previous content feed. An engagement score measures a predicted level of interaction the user would have with a content item. In some embodiments, the engagement score is the sum of, for each action a user can take on a content item, the product of the probability of the user taking the action and a value of the user taking the action. The value of the user taking the action may be determined from, e.g., likes associated with the content item, comments associated with the content item, forwards or shares of the content item, postings of the content item, interactions of users connected to the user with the content item, status of the content item, or some combination thereof. For example, in some embodiments, the engagement score ES for a content item may be calculated by $$ES|_i = \overline{EV} \cdot \overline{VV} \quad (1)$$

Where $\overline{EV}$ is an engagement vector for each action, e.g., $\overline{EV} = [eCTR_{Like}, eCTR_{share}, \ldots eCTR_n]$, "eCTR" is the estimated click through rate, "n" is an index referring to the eCTR of a particular action, and $\overline{VV}$ is a value vector indicating values for the user taking particular actions, e.g., $\overline{VV} = [2_{Like}, 5_{share}, \ldots X_n]$, and "i" is an index referring to a particular content item. The values in the value vector for different actions may be adjusted by the social networking system 140, may differ from user to user, change for a particular user over time, etc.

The engagement scores may be based on information retrieved from the user profile store 205, the content store 210, the action log 220, and/or the edge store 225. For example, an engagement score may be based on affinities between the user and an object or between the user and another user associated with various content items. Additionally, prior actions associated with the user and associated with content items previously presented to the user may be used to determine the expected amount of user interaction with the content items to be presented. In one embodiment, user interactions with content items presented within a specified time interval are retrieved from the action log 220 and used to determine the engagement score for one or more content items.

In some embodiments, where the content item is an advertisement, when generating an engagement score associated with the advertisement, the scoring module 240 accounts for a bid amount associated with the advertisement as well as an expected amount of user interaction with the advertisements. In one embodiment, the scoring module 240 applies a conversion factor to the expected amount of user interaction and the bid amount to convert the expected amount of user interaction and the bid amount to a common unit of measurement. The score associated with the advertisement is generated by combining the expected amount of user interaction and the bid amount after application of the conversion factor. For example, the conversion factor is applied to the bid amount associated with an advertisement, and the bid amount after application of the conversion factor is combined with the expected amount of user interaction with the advertisement to generate the score associated with the advertisement. Combining a bid amount with an expected amount of user interaction is further described in U.S. patent application Ser. No. 13/545,266, filed on Jul. 10, 2012, which is hereby incorporated by reference in its entirety.

Additionally, in some embodiments, the scoring module 240 determines that a user has a highest affinity for a specific user and increases the number of stories in the content feed associated with the specific user or modifies the positions in the content feed where stories associated with the specific user are presented. Additional actions performed by users with higher affinities may receive higher engagement scores. Determining affinity between objects in a social networking system 108 is further described in U.S. application Ser. No. 12/978,265, filed on Dec. 23, 2010, which is incorporated by reference herein in its entirety. The scoring module 240 provides the scored new content items and/or popular content items to the continuous feed manager 245.

As mentioned above, in some embodiments, the scoring module 240 also generates new engagement scores for each of the read content items in the read section of the previous content feed. In some embodiments, an engagement score of a read content item may increase above a threshold value, causing the status tracker 230 to change the status associated with the content item from read to popular. For example, connections to the user in the social networking system 140 may have liked, reposted, etc., a read content item, thereby increasing its associated engagement score. Thus, the engagement score for the read content item may change over time, and if the engagement score increases over a threshold value the status tracker 230 may change the status of the content item to popular which the continuous feed manager 245 may then use in the generation of the current content segment. In this case, the user is provided a content item that has already been read a second time given its importance or engagement score.

The continuous feed manager 245 generates current content segments using the new content items, popular content items, and unread sections of content feeds based in part on their respective engagement scores. A current content segment is a portion of a content feed that represents information new to the user or having engagement scores that have since increased above some threshold value. The current content segment may include, e.g., new content items, popular content items, missed content items, or some combination thereof. For a given user, the social networking system 140 identifies any missed content items for inclusion in the current content segment by incorporating an unread section of the last content feed provided to a client device 110 associated with the user. The social networking system identifies new content items and/or popular content items using the scored content items provided by the scoring module 240.

To generate a current content segment, the continuous feed manager 245 determines an order for the new content items, the content items from the unread section of the previous content feed, the popular content items, or some combination thereof. The continuous feed manager 245 determines the order of the content items using the status of the content items and their respective engagements scores. In some embodiments, the continuous feed manager 245 may also use position discount values (as described below) in the determination of the order of content items.

In some embodiments, the continuous feed manager 245 identifies the new content items and ranks the identified new content items by their engagement scores. The continuous feed manager 245 places the ranked new content items at the top of the current content segment (i.e., would be presented first in the content feed). The continuous feed manager 245 then places the remaining content items (i.e., popular content items and/or content items in the unread section of the previous content feed) by their engagement scores and places them immediately after the last new content item in the current content segment. These remaining content items may be placed according to a previous scoring done when generating the last content feed, or they may be re-scored and presented according to the updated scoring. In some embodiments, the social networking system 140 may weight the engagement scores of the new content items and/or the content items in the unread section such that a new content item always has an engagement score that is higher than the content items in the unread section.

In alternate embodiments, the current content section is such that the content items in the unread section may be ranked higher than one or more new content items. In these embodiments, the continuous feed manager 245 ranks both the new content items and the content items in the unread section by their respective engagement score. Again, prior scores can be used in this ranking for the missed content or the missed content items can be re-scored. For example, the continuous feed manager 245 may rank the new content items and the content items from highest to lowest engagement score. The content item with the highest engagement score would be places at the top of the current content section, and the content item with the lowest engagement score would be placed at the bottom of the current content section.

In some embodiments, the continuous feed manager 245 applies a position discount value to an engagement score associated with a content item in the current content segment based on a position in the interface in which content associated with the application is presented. A position discount value reflects a predicted decrease in user interaction with the content item based on a position in the interface in which the content item is presented. For example, the continuous feed manager 245 may apply position discount values to the engagement scores for each of the content items in the current content segment. In one example, the position discount value is based on a location within the interface in which the content item is presented relative to positions in the interface in which other content items are presented. Alternatively, the position discount value is based on a position in which a content item is presented relative to a reference position in the interface. The position discount value associated with a position may be based at least in part on a distance between the position and a reference position in the interface. In a content feed, there are a number of positions in which each content item can be placed. The first content item in the feed is the most likely to be interacted with by a viewing user, and each position thereafter is discounted by a certain amount that reflects a discount in likelihood of interaction with a content item due to its being in a less favorable position. Users often view only the first few stories in the feed and the farther down a story is, the less likely it is to be viewed. In some embodiments, the position discount value associated with each position in the feed is a known value determined in advance by the social networking system and is applicable across various feeds. Determining a position discount value associated with a position is further described in U.S. patent application Ser. No. 14/049,429, filed on Oct. 9, 2013, which is hereby incorporated by reference in its entirety.

The continuous feed manager 245 generates content feeds using current content segments and read sections of previous content feeds. In some embodiments, the continuous feed manager 245 generates a content feed by inserting a current content segment associated with a requesting user after the read section of the previous content feed for that user. In some embodiments, the continuous feed manager 245 may generate instructions for the client devices 110 that cause client devices 110 to present a content item at the top of the current content segment (e.g., highest ranking content item) first to the user. Thus a user could scroll down in the content feed to see lower ranked content items which are either have statuses of new, unread, or missed. Alternatively, the user may scroll upward toward read content items that have been previously presented to the user. In other embodiments, the continuous feed manager 245 may generate instructions for the client device 110 that cause client device 110 to present the read content item that most recently became a read content item first to the user.

In alternate embodiments, the continuous feed manager 245 may invert the content feed before providing it to the client device 110. An inverted content feed is one where the current content segment is positioned above the read content segment of the previous content feed. In these embodiments, content items in the current content segment and the read section of the previous content feed are inverted. Accordingly, the highest ranking content item in the current content segment is at the bottom of the current content segment, and the most recent content item in the read section is at the top of the read section. In this case, a user would scroll upward to get to content items associated with the current content segment, and would scroll downward to get to content items in the read section.

In some embodiments, the continuous feed manager 245 may generate instructions for the client devices 110 that cause client devices 110 to emphasize content items that are part of the current content segment (e.g., a new content item, a missed content item, and/or an popular content item). The instructions cause the client devices 110 to emphasize content items that that are part of the current content segment by, e.g., adding a vertical bar to one side of the content item being displayed, highlighting the boarder of the content item, oversizing the content item, some other indicator that differentiates the content item from other content items that have previously been presented by the client device, or some combination thereof. Once the content items have been presented, the instructions cause the client devices 110 to stop emphasizing the content items.

The web server 250 links the social networking system 140 via the network 120 to the one or more client devices 110, as well as to the one or more third party systems 130. The web server 250 serves web pages, as well as other web-related content, such as JAVA®, FLASH®, XML and so forth. The web server 250 may provide content feeds to the client device 110. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or RIM®.

Generating a Continuous Content Feed

Figure 3:
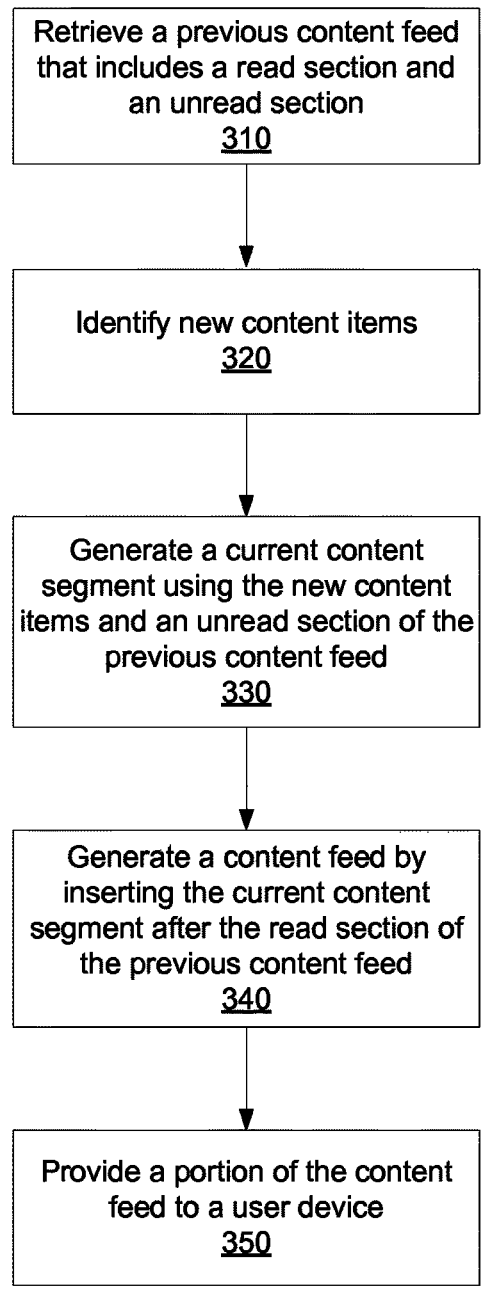
FIG. 3 is a flowchart illustrating a process for generating a continuous content feed according to an embodiment.

FIG. 3 is a flowchart illustrating a process for generating a continuous content feed according to an embodiment. In one embodiment, the process of FIG. 3 is performed by the social networking system 140. However, in other embodiments, other entities may perform some or all of the steps of the process. Likewise, embodiments may include different and/or additional steps, or perform the steps in different orders.

The social networking system 140 retrieves 310 a previous content feed that was last provided to a client device 110 associated with a viewing user of a social networking system 140. The social networking system 140 retrieves the previous content feed from the content store 210. In other embodiments, the social networking system retrieves the previous content feed from one or more other modules. The previous content feed includes a read section and an unread section. The read section is the portion of the previous content feed that includes content items that the viewing user read (i.e., the content items have a read status). The content items in the read section are ordered by time stamp—and the order corresponds to the order in which they were presented to the user. The unread section is the remaining portion of the content feed which includes content items that have not been read by the user (i.e., the content items have a missed status).

The social networking system 140 identifies 320 new content items for presentation to the user in a content feed. The social networking system 140 identifies and retrieves new content items that are likely be relevant to the identified user. The social networking system 140 may consider connections to the user, user preferences for stories, targeting information for advertisements, etc., in identifying new content items. Additionally, in some embodiments, the social networking system 140 may generate new content items based on based on information in the action log 220 and in edge store 225 or may select candidate stories included in content store 210.

The social networking system 140 generates 330 a current content segment using the new content items, the unread section of the previous content feed, popular content items, or some combination thereof. The social networking system 140 generates engagement scores associated with the new content items and/or the content items in the unread section of the previous content feed. For example, the social networking system 140 may determine value vectors and engagement vectors for the new content items and the content items in the unread section, and then determine the engagement scores for the new content items and the content items in the unread section using equation (1) described above. Additionally, in some embodiments, one or more of the engagement scores may be modified by position discount values. The social networking system 140 then generates the current content section using the scored content items.

In some embodiments, the social networking system 140 also generates engagements scores for the content items in the read section of the previous content feed. If an engagement score of a read content item increases above a threshold value (e.g., may be caused by a certain number of comments, likes, etc.), the social networking system 140 changes the status associated with the content item from read to unread. The social networking system 140 would then include the popular content items in the generation of the current content section.

In some embodiments, the current content section is such that the new content items are ranked higher (presented before) than the content items coming from the unread section of the previous content feed and/or the popular content items. In these embodiments, the social networking system 140 ranks the new content items in accordance with their respective engagement score. The social networking system 140 then ranks the content items in the unread section and/or popular content items in accordance with their respective engagement scores, and the ranked content items are then placed below the lowest ranked new content item. Alternatively, the social networking system 140 may weight the engagement scores of the new content items and/or the content items in the unread section and the popular content items such that a new content item always has an engagement score that is higher than the content items in the unread section and any popular content items.

In alternate embodiments, the current content section is such that the content items in the unread section and/or an popular content item may be ranked higher than one or more new content items. In these embodiments, the social networking system 140 ranks the new content items, the content items in the unread section, and any popular content items, by their respective engagement score. If, for example, a content item in the unread section has a higher engagement score than a new content item, the content item would be ranked higher than the new content item.

The social networking system 140 generates 340 a content feed by inserting the current content segment after the read section of the previous content feed. The highest ranked content item in the current content segment would immediately follow the most recent content item that was presented to the viewing user (i.e., the most recent content item to be associated with a read status). Accordingly, the content feed is composed of a read portion that has a fixed order corresponding to the order in which the read content items were presented to the viewing user, followed by the current content segment.

The social networking system 140 provides 350 a portion of the content feed to a user device associated with the viewing user. In some embodiments, the portion of the content feed is configured such that the highest ranking content item in the current content segment is presented first to the user. Alternatively, the portion of the content feed is configured such that the most recent read content item is presented first to the user. A portion may be some or all of the content feed. For example, the portion may include one or more read content items that are immediately above the current content segment as well as one or more subsequent content items from the current content segment.

Note that the generated content feed is a continuous content feed. A continuous content feed is a content feed that is not a striped feed. A striped feed is a feed where new content items, read content items, and popular content items are interlaced throughout the content feed. In contrast, a continuous feed groups all of the read content items together and places other content items (e.g., new, unread, missed) in a group either above or below the grouping of read content items. As the user scrolls down through the content items, the client device 110 fetches additional portions of the content feed from the social networking system 140 such that the user is presented with a continuous feed. Note that as the user continues to scroll downward into content items associated with the current content segment, the presented portions of the content feed all have not been presented to the user. Accordingly, the user is able to scroll through a continuous feed of content that has not been previously presented to them. This structure of the content feed prevents striping (i.e., read content items intermixed with new, unread, and missed content items) as there are only two basic sections of the content feed: (1) a read section; and (2) the current content segment.

Similarly, as the user scrolls up through the content items, the client device 110 fetches additional portions of the content feed from the social networking system 140. For example, as the user scrolls up in the portion of the content feed toward read content items, the client device 110 fetches additional portions of the content feed from the social networking system 140 such that the user is able to scroll through previously read content items. In some embodiments, the user is able to scroll back to a first content item read by the user. In other embodiments, the social networking system 140 may have dropped read content items that are older than a threshold time value (e.g., 1 week old, 1 month old, etc.), and the user is able to scroll back through read content items that are more recent than the time threshold value.

In alternate embodiments (not shown), the social networking system 140 may invert the content feed such that the current content segment is positioned above the read content segment of the previous content feed. In these embodiments, content items in the current content segment and the read section of the previous content feed are inverted. Accordingly, the highest ranking content item in the current content segment is at the bottom of the current content feed, and the most recent content item in the read section is at the top of the read section. In this case, a user would scroll upward to get to content items associated with the current content segment, and would scroll downward to get to content items in the read section.

Figure 4:
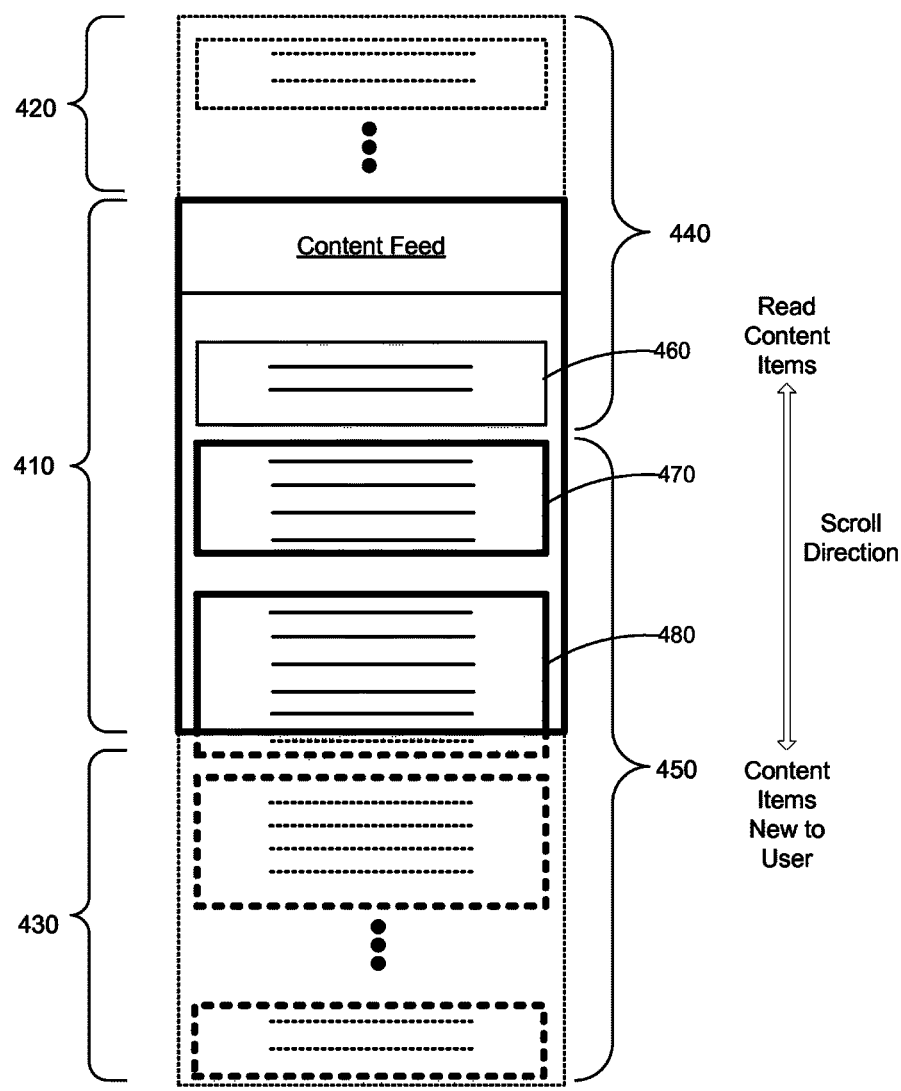
FIG. 4 illustrates a continuous content according to an embodiment.

FIG. 4 illustrates a continuous content feed 400 according to an embodiment. The content feed 400 includes an active portion 410 of the content feed 400 that is being displayed by a client device 110, and a top virtual portion 420 and a bottom virtual portion 430 of the content feed 400 that may include content items that are not being displayed by the client device 110. Content items in the top virtual portion 420 and/or the bottom virtual portion 430 are content items stored on the client device 110 and/or content items that may be retrieved from the social networking system 140. The content feed 400 includes a read section 440 and a current content segment 450. The read section 440 includes content items which have a read status and were part of a previous content feed. For example, the read section 440 includes a content item 460 that has a read status (i.e., is a read content item). The content item 460 is the last content item presented to the user in the previous content feed. The current content segment 450 includes content items with statuses of new, popular, missed, or some combination thereof. In FIG. 4, the active portion 410 is presenting two content items 470, 480 that are part of the current content segment 450. The client device 110 is emphasizing the content items 470, 480 using a highlighted border. Once the client device 110 determines that content items 470, 480 have been presented to the user, the client device 110 stops emphasizing the content items 470, 480 (e.g., the highlighted boarder fades away such that it has the same boarder as a read content item). Additionally, one a content item has been determined to have been presented to the user, the client device 110 changes a status of a content item to read and notifies the social networking system 140 of the change in status of the content item.

As a user scrolls through the content feed 400, content items in the active portion 410 may be moved into the top virtual portion 420, and content items in the bottom virtual portion 430 may be moved into the active portion 410, or vice versa, depending on whether the user is scrolling up or down. Note, as the user scrolls up/down through the content items, the client device 110, fetches additional portions of the content feed from the social networking system 140 such that the user is presented with a continuous feed.

SUMMARY

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
   providing a content feed to a first client device associated with a user of a social networking system, the content feed including a plurality of content items that are associated with users of the social networking system;
   identifying a read section and an unread section of the content feed, the read section including one or more read content items, and the unread section including one or more missed content items in the content feed, wherein a read content item is a content item, of the plurality of content items, that was presented by the first client device and a missed content item is a content item, of the plurality of content items, that was part of the content feed for the first client device, but was not presented by the first client device;
   receiving a request for a subsequent content feed from a second client device associated with the user,
   identifying one or more new content items that are associated with users of the social networking system, wherein a new content item is a content item that has not been previously provided as part of a content feed to any user device associated with the viewing user;
   generating a current content segment that includes the one or more new content items and the unread section of the content feed;
   generating the subsequent content feed by inserting the current content segment after the read section of the content feed; and
   providing a portion of the subsequent content feed to the second client device.

2. The method of claim 1, wherein generating the current content segment that includes the one or more new content items and the unread section of the content feed, comprises:
   generating engagement scores for the one or more new content items and for the one or more missed content items, the engagement scores measuring predicted levels of interaction the user would have with the corresponding content items;
   ranking the one or more new content items from highest engagement score to lowest engagement score;
   ranking the one or more missed content items in the unread section from highest engagement score to lowest engagement score; and
   assembling the current content segment by placing the ranked one or more new content items above the ranked one or more missed content items.

3. The method of claim 1, wherein generating the current content segment that includes the one or more new content items and the unread section of the content feed, comprises:
generating engagement scores for the one or more new content items and for the one or more missed content items, the engagement scores measuring predicted levels of interaction the user would have with the corresponding content items;
ranking the one or more new content items and the one or more missed content items from highest engagement score to lowest engagement score; and
assembling the ranked one or more new content items and the one or more missed content items in the unread section into the current content segment, and at least one of the one or more missed content items is above a new content item in the current content segment.

4. The method of claim 1, wherein generating the current content segment that includes the one or more new content items and the unread section of the content feed, comprises:
generating engagement scores for the one or more new content items and for the one or more missed content items, the engagement scores measuring predicted levels of interaction the user would have with the corresponding content items;
weighting the engagement scores for the one or more new content items such that they are higher than the engagement scores for the one or more missed content items;
ranking the one or more new content items and the one or more missed content items from highest engagement score to lowest engagement score; and
assembling the ranked one or more new content items and the one or more missed content items in the unread section into the current content segment.

5. The method of claim 1, wherein the portion of the subsequent content feed includes a read content item that was the last content item presented in the content feed and a highest ranking content item in the current content segment, and the portion of the subsequent content feed is configured such that the second client device presents the highest ranking content item in the current content segment first to the user, and the highest ranking content item is directly below the read content item in the portion of the subsequent content feed.

6. The method of claim 1, wherein the portion of the subsequent content feed includes a read content item that was the last content item presented in the content feed and a highest ranking content item in the current content segment, and the portion of the subsequent content feed is configured such that the second client device presents the read content item first to the user, and the highest ranking content item in the current content segment is directly below the read content item, and another read content item is above the read content item.

7. The method of claim 1, wherein the first client device and the second client device are the same client device.

8. A method comprising:
providing a content feed to a first client device associated with a user of a social networking system, the content feed including a plurality of content items that are associated with users of the social networking system;
identifying a read section and an unread section of the content feed, the read section including one or more read content items, and the unread section including one or more missed content items in the content feed, wherein a read content item is a content item, of the plurality of content items, that was presented by the first client device and a missed content item is a content item, of the plurality of content items, that was part of the content feed for the first client device, but was not presented by the first client device;
receiving a request for a subsequent content feed from a second client device associated with the user;
identifying one or more new content items that are associated with users of the social networking system, wherein a new content item is a content item that has not been previously provided as part of a content feed to any user device associated with the viewing user;
generating a current content segment that includes the one or more new content items and the unread section of the content feed;
generating the subsequent content feed by inserting the current content segment above the read section of the content feed; and
providing a portion of the subsequent content feed to the second client device.

9. The method of claim 8, wherein generating the current content segment that includes the one or more new content items and the unread section of the content feed, comprises:
generating engagement scores for the one or more new content items and for the one or more missed content items, the engagement scores measuring predicted levels of interaction the user would have with the corresponding content items;
ranking the one or more new content items from lowest engagement score to highest engagement score;
ranking the one or more missed content items in the unread section from lowest engagement score to highest engagement score; and
assembling the current content segment by placing the ranked one or more new content items below the ranked one or more missed content items.

10. The method of claim 8, wherein generating the current content segment that includes the one or more new content items and the unread section of the content feed, comprises:
generating engagement scores for the one or more new content items and for the one or more missed content items, the engagement scores measuring predicted levels of interaction the user would have with the corresponding content items;
ranking the one or more new content items and the one or more missed content items from lowest engagement score to highest engagement score; and
assembling the ranked one or more new content items and the one or more missed content items in the unread section into the current content segment, and at least one of the one or more missed content items is below a new content item in the current content segment.

11. The method of claim 8, wherein generating the current content segment that includes the one or more new content items and the unread section of the content feed, comprises:
generating engagement scores for the one or more new content items and for the one or more missed content items, the engagement scores measuring predicted levels of interaction the user would have with the corresponding content items;
weighting the engagement scores for the one or more new content items such that they are higher than the engagement scores for the one or more missed content items;
ranking the one or more new content items and the one or more missed content items from lowest engagement score to highest engagement score; and
assembling the ranked one or more new content items and the one or more missed content items into the current content segment.

12. The method of claim 8, wherein the portion of the subsequent content feed includes a read content item that was the last content item presented in the content feed and a highest ranking content item in the current content segment, and the portion of the subsequent content feed is configured such that the second client device presents the highest ranking content item in the current content segment first to the user, and the highest ranking content item is directly above the read content item in the portion of the subsequent content feed.

13. The method of claim 1, wherein the portion of the subsequent content feed includes a read content item that was the last content item presented in the content feed and a highest ranking content item in the current content segment, and the portion of the subsequent content feed is configured such that the second client device presents the read content item first to the user, and the highest ranking content item in the current content segment is directly above the read content item, and another read content item is below the read content item.

14. The method of claim 1, wherein the first client device and the second client device are the same client device.

15. A non-transitory computer-readable storage medium having instructions encoded thereon that, when executed by a processor, cause the processor to:
providing a content feed to a first client device associated with a user of a social networking system, the content feed including a plurality of content items that are associated with users of the social networking system;
identifying a read section and an unread section of the content feed, the read section including one or more read content items, and the unread section including one or more missed content items in the content feed, wherein a read content item is a content item, of the plurality of content items, that was presented by the first client device and a missed content item is a content item, of the plurality of content items, that was part of the content feed for the first client device, but was not presented by the first client device;
receiving a request for a subsequent content feed from a second client device associated with the user,
identifying one or more new content items that are associated with users of the social networking system, wherein a new content item is a content item that has not been previously provided as part of a content feed to any user device associated with the viewing user;
generating a current content segment that includes the one or more new content items and the unread section of the content feed;
generating the subsequent content feed by inserting the current content segment after the read section of the content feed; and
providing a portion of the subsequent content feed to the second client device.

16. The non-transitory computer-readable storage medium of claim 15, wherein generating the current content segment that includes the one or more new content items and the unread section of the content feed, comprises:
generating engagement scores for the one or more new content items and for the one or more missed content items, the engagement scores measuring predicted levels of interaction the user would have with the corresponding content items;
ranking the one or more new content items from highest engagement score to lowest engagement score;
ranking the one or more missed content items in the unread section from highest engagement score to lowest engagement score; and
assembling the current content segment by placing the ranked one or more new content items above the ranked one or more missed content items.

17. The non-transitory computer-readable storage medium of claim 15, wherein generating the current content segment that includes the one or more new content items and the unread section of the content feed, comprises:
generating engagement scores for the one or more new content items and for the one or more missed content items, the engagement scores measuring predicted levels of interaction the user would have with the corresponding content items;
ranking the one or more new content items and the one or more missed content items from highest engagement score to lowest engagement score; and
assembling the ranked one or more new content items and the one or more missed content items in the unread section into the current content segment, and at least one of the one or more missed content items is above a new content item in the current content segment.

18. The non-transitory computer-readable storage medium of claim 15, wherein generating the current content segment that includes the one or more new content items and the unread section of the content feed, comprises:
generating engagement scores for the one or more new content items and for the one or more missed content items, the engagement scores measuring predicted levels of interaction the user would have with the corresponding content items;
weighting the engagement scores for the one or more new content items such that they are higher than the engagement scores for the one or more missed content items;
ranking the one or more new content items and the one or more missed content items from highest engagement score to lowest engagement score; and
assembling the ranked one or more new content items and the one or more missed content items in the unread section into the current content segment.

19. The non-transitory computer-readable storage medium of claim 15, wherein the portion of the subsequent content feed includes a read content item that was the last content item presented in the content feed and a highest ranking content item in the current content segment, and the portion of the subsequent content feed is configured such that the second client device presents the highest ranking content item in the current content segment first to the user, and the highest ranking content item is directly below the read content item in the portion of the subsequent content feed.

20. The non-transitory computer-readable storage medium of claim 15, wherein the portion of the subsequent content feed includes a read content item that was the last content item presented in the content feed and a highest ranking content item in the current content segment, and the portion of the subsequent content feed is configured such that the second client device presents the read content item first to the user, and the highest ranking content item in the current content segment is directly below the read content item, and another read content item is above the read content item.

* * * * *